Patented June 16, 1953

2,642,355

UNITED STATES PATENT OFFICE 2,642,355

PRODUCTION OF CONCENTRATED FERTILIZER BY BASE EXCHANGE

Robert D. Pike, Greenwich, Conn.

Application August 29, 1950, Serial No. 182,106

11 Claims. (Cl. 71—34)

This invention relates to the manufacture of crude double carrier potassium fertilizers in which both the basic and acidic radicals contain plant food elements by base exchange between the sodium of a solution of a sodium salt of a plant food acid and the potassium of Wyomingite. In these compounds in which both the basic and the acidic radical contain plant food elements, according to the preferred process, a potassium nitrate-sodium nitrate fertilizer is produced which contains approximately 14.36% nitrogen, 37.30% $K_2O$, and 7.29% $Na_2O$, or a monopotassium phosphate-monosodium phosphate fertilizer is produced which contains approximately 53.40% $P_2O_5$, 28.30% $K_2O$ and 4.74% $Na_2O$. Other varieties of fertilizers may be produced by this process if desired.

Wyomingite is a potash bearing igneous rock which occurs in the southwestern part of Wyoming, from which about 8 pounds of $K_2O$ per 100 pounds of rock can be economically recovered by base exchange with sodium under suitable conditions of pressure and temperature.

In carrying out the process of the present invention, I utilize the system of base exchange between sodium and potassium ions by extracting potassium from Wyomingite through base exchange at temperatures of about 200° C. and steam pressures of about 200 to 250 pounds per square inch.

While any suitable base exchange procedure may be utilized, such as that described, for example, in my paper entitled, "Experiments with Lemberg Reaction as Applied to Wyomingite," "Industrial and Engineering Chemistry," volume 25, No. 3, pages 259–261 (March 1933), or in my Patent No. 2,455,190, I prefer to utilize a plurality of base exchange vessels in series with simultaneous recirculation through each vessel. Such a process is described in my copending application Serial No. 183,437, filed September 6, 1950. In this manner I am able to recover most of the recoverable potash with a smaller amount of the sodium salts and to provide an end product in which the potassium content exceeds the sodium content by a ratio of 5 to 1 or more. The use of a small amount of the sodium salt in producing the nitrate fertilizer gives a solution from the base exchange step from which potassium nitrate can be crystallized in pure form and the remainder of the solution run to dryness to produce a satisfactory fertilizer.

In said copending application I disclosed in greater detail a system and apparatus for continuous countercurrent base exchange wherein a base exchange solution is flowed upwardly through a series of substantially fixed deep beds of Wyomingite particles or fragments which are large enough to permit relatively free flow of the solution therethrough and thereby maintain the beds in a substantially fixed position. Such beds are typified in said application by so-called quiescent beds or by beds maintained in teeter equilibrium or balance by the upwardly flowing solution. Such substantially fixed beds are maintained by regulating the upward velocity through the beds in relation to the size of the particles or fragments so as to maintain good contact between the Wyomingite and the flowing solution without displacing the beds. Such fixed beds are to be contrasted with solid particles of Wyomingite in linear motion or such solid particles under substantial agitation or turbulence.

The vessels used should be capable of sustaining an internal pressure of at least 225 pounds per square inch, and means should preferably be provided to recirculate the solution of the base exchange salt through the Wyomingite in each vessel to provide the necessary agitation. The vessels should preferably be interconnected in such a way that the vessels in line may be switched, preferably every hour, so that the base exchange solution circulates from the last to the first vessel in the line, the base exchange solution first contacting the vessel which contains the Wyomingite which has been undergoing base exchange for the longest period of time and progressively flowing with recirculation in each vessel, to the first vessel in the line into which fresh Wyomingite has been inserted.

Although the present invention is not dependent upon the particular process of base exchange used, or the apparatus in which the base exchange is carried out, I prefer to operate the process to produce crude potassium nitrate-sodium nitrate fertilizers or crude monopotassium-monosodium phosphate but, as will be apparent as this description proceeds, the process may be operated to produce crude mixtures of other potassium and sodium salts suitable for use as fertilizers by base exchange between the sodium salt of a fertilizer acid and the potassium of Wyomingite.

In producing crude potassium nitrate-sodium nitrate fertilizer according to my preferred process, I introduce under pressure into the line of vessels containing crushed Wyomingite a continuous stream of a solution of sodium nitrate, preferably rendered slightly alkaline by the presence of about 2 G/l $Na_2CO_3$ and containing about 27.3 pounds NaNO3 per 100 pounds of water. The sodium nitrate solution is introduced under pressure into the vessel occupying the last position in the line containing the most nearly spent Wyomingite, and the solution is withdrawn from the vessel occupying the first position in the line into which fresh Wyomingite has just been introduced. When operating according to my preferred procedure, a stream of finished liquor containing about 26 pounds KNO3 per 100 pounds of water and not more than about 5.5 pounds NaNO3 may be withdrawn from the first vessel. The free K2CO3 in this liquor may then be neutralized with HNO3 and this solution may be run to dryness, producing a crude potassium nitrate-sodium nitrate composition, which is highly suitable as a concentrated fertilizer carrying both basic and acidic radicals available as plant food. I use a small amount of Na2CO3 in the feed so that the base exchange step is carried out under slightly alkaline conditions so as to inhibit corrosion in the base exchange vessels.

The solution produced in this manner is sufficiently rich in potassium nitrate and sufficiently poor in sodium nitrate that pure potassium nitrate can be crystallized therefrom by simple evaporation. I prefer, therefore, to withdraw sufficient of the finished stream of salt solution from the first pressure vessel and evaporate it to produce about 15% of the total potassium nitrate present in the liquor as a pure compound, which is known as saltpeter, and to return the mother liquor from the crystallization of the pure KNO3 to the remainder of the liquor flowing from the base exchange vessels, and to then run the main flow to dryness. This produces a crude potassium nitrate-sodium nitrate with only slightly more Na2O content than if no KNO3 had been removed and, at the same time, permits production of substantial amounts of pure KNO3 which commands a higher price than the crude material.

When making crude monopotassium phosphate-monosodium phosphate fertilizers, I prefer to introduce under the same pressure, a continuous stream of a solution of monosodium phosphate which may carry additional Na2O to render it only slightly on the acid side of neutral, or even slightly on the alkaline side, containing about 38.4 pounds equivalent NaH2PO4 per 100 pounds H2O and I withdraw from the vessel occupying the first position in the line a stream of finished liquor containing about 35 pounds KH2PO4 per 100 pounds water and about 8 pounds NaH2PO4, or equivalent concentration of slightly more basic compounds. The pH of pure KH2PO4 is about 4 and of the finished liquor produced by this process about 6.75–7.25. To this withdrawn stream I therefore add the necessary amount of H3PO4 to reach a pH value of 4.4–6.0 and preferably nearer to pH 6 than to 4.4, as I have found this preferred range of pH gives a non-hydroscopic product when run to dryness. I have also found that a pH of 4.4 corresponds to 98% of P2O5 present as the monoalkali phosphate and 2% as the dialkali phosphate and a pH of 6 corresponds to 88% and 12%, respectively, of monoalkali and dialkali phosphate.

Figure 1:
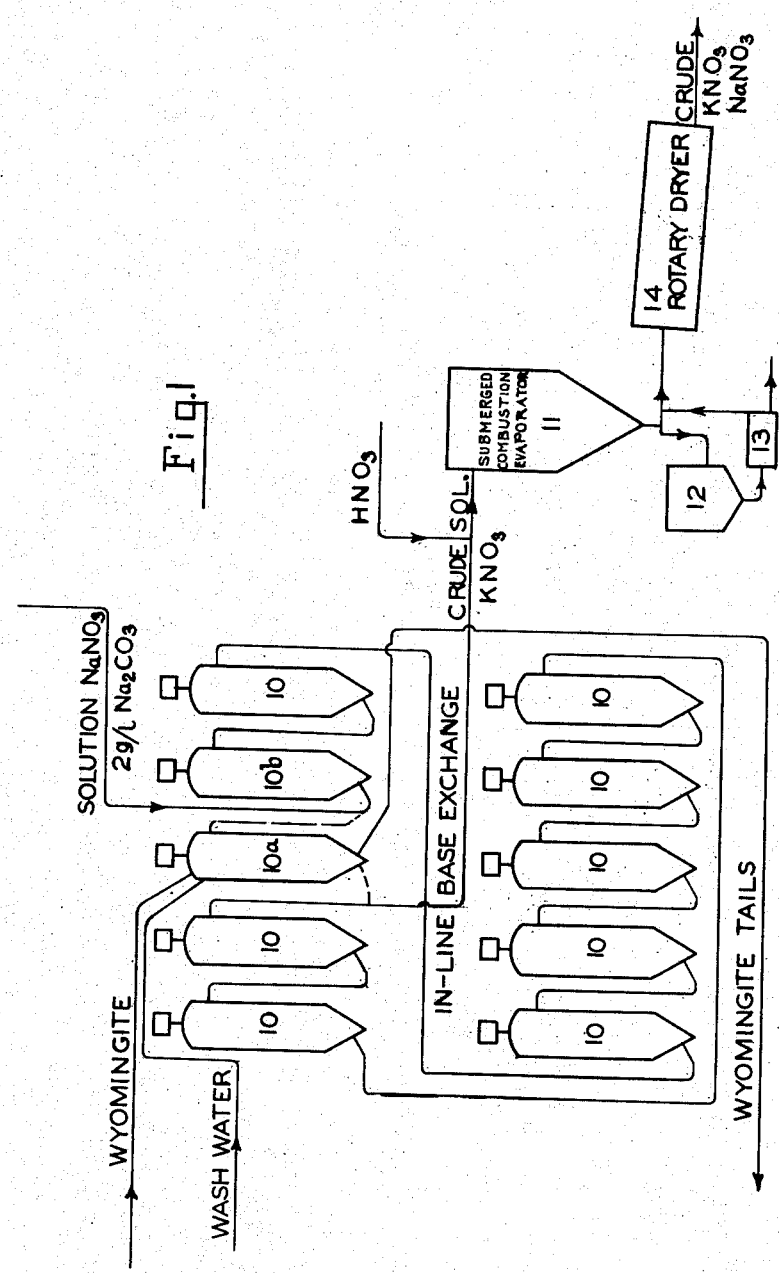
Figure 1 shows a diagrammatic arrangement of pressure vessels for carrying out the in-line base exchange process, as applied to the making of crude KNO3—NaNO3 fertilizer with the optional process of producing up to about 15% of the total KNO3 as pure saltpeter.

In the drawings (Figure 1) 10 represents a series of base exchange vessels into which Wyomingite crushed to a suitable fineness is placed, and into which the slightly alkaline solution of sodium nitrate is introduced under pressure and maintained at a temperature of around 200° C. for the base exchange step. The solution of NaNO3 containing about 27.3 pounds of NaNO3 per 100 pounds H2O is introduced into the vessel occupying the last position in the line and containing the most nearly spent Wyomingite, and is circulated progressively through the vessels preferably with recirculation in each vessel until it reaches the first vessel in the line in which fresh Wyomingite has just been placed. At least one vessel in the line, such as 10a, is always out of the circulation and is being discharged and recharged with fresh Wyomingite. By suitable valve arrangements the circulation may be switched so as to cut out the last vessel in the line, such as 10b, and bring the freshly charged vessel 10a into the circulation. While vessel 10b is out of circulation, the spent Wyomingite is washed and discharged and discarded and the vessel is recharged with fresh Wyomingite. The circulation may be progressively switched through the entire line so that with each switch a new freshly charged base exchange vessel is brought into line and a vessel containing spent Wyomingite is cut out of the line. Two or more vessels may be out of circulation and may be undergoing discharge and refilling with fresh Wyomingite without materially affecting the operation of the process.

Figure 2:
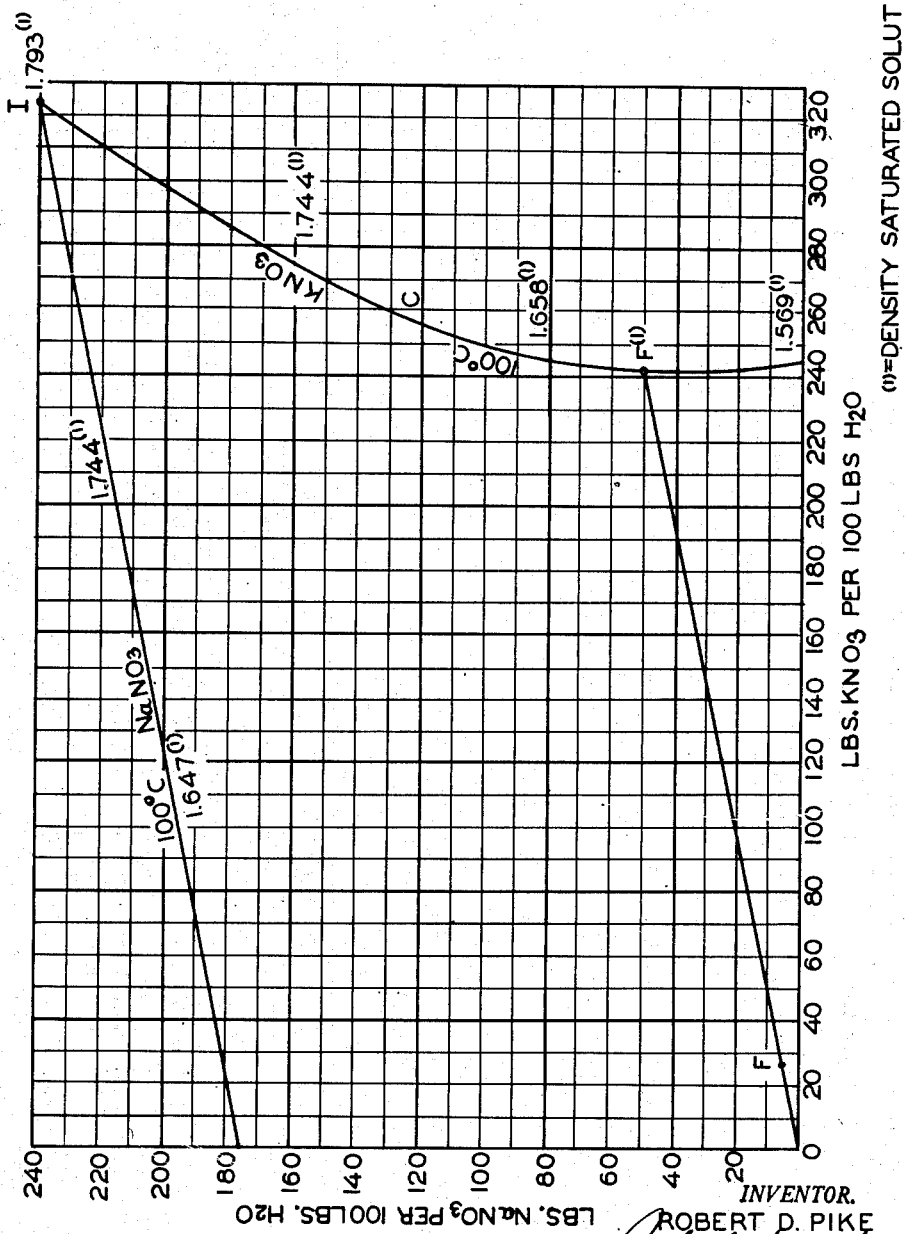
Figure 2 shows the portion of the system KNO3—NaNO3—water as applied to the present invention.

The finished solution, corresponding to point F, Figure 2, is neutralized with HNO3 and then passes to an evaporator 11. This may be of any suitable well-known type, but I prefer to employ submerged combustion if cheap natural gas is available. This evaporates the solution to the point F', Figure 2, where I may withdraw about 21% of the flow and evaporate this latter portion in a vacuum evaporator 12, to point I, thus crystallizing out about 15% of the total KNO3 as saltpeter. These latter crystals are separated in centrifuge 13 and are dried and disposed elsewhere. The mother liquor corresponding to point I, Figure 2, is recycled to the main stream and the whole run to dryness in rotary drier 14, producing a crude KNO3—NaNO3. If none of the flow is diverted through 12, the product has about the following analysis:

|  | Per cent |
|---|---|
| Na2O | 6.37 |
| K2O | 38.50 |
| N2 | 14.34 |

If 21% of the flow is diverted through 12, producing 15% of the KNO3 as saltpeter, the remaining crude compound has about the following analysis:

|  | Per cent |
|---|---|
| Na2O | 7.29 |
| K2O | 37.30 |
| N2 | 14.36 |

This last named product is acceptable as a fertilizer and as saltpeter brings a considerably higher price than the crude salt, I ordinarily find it preferable to divert up to about 21% of the flow through 12. The fertilizer products produced in this way are completely soluble plant foods.

Figure 3:
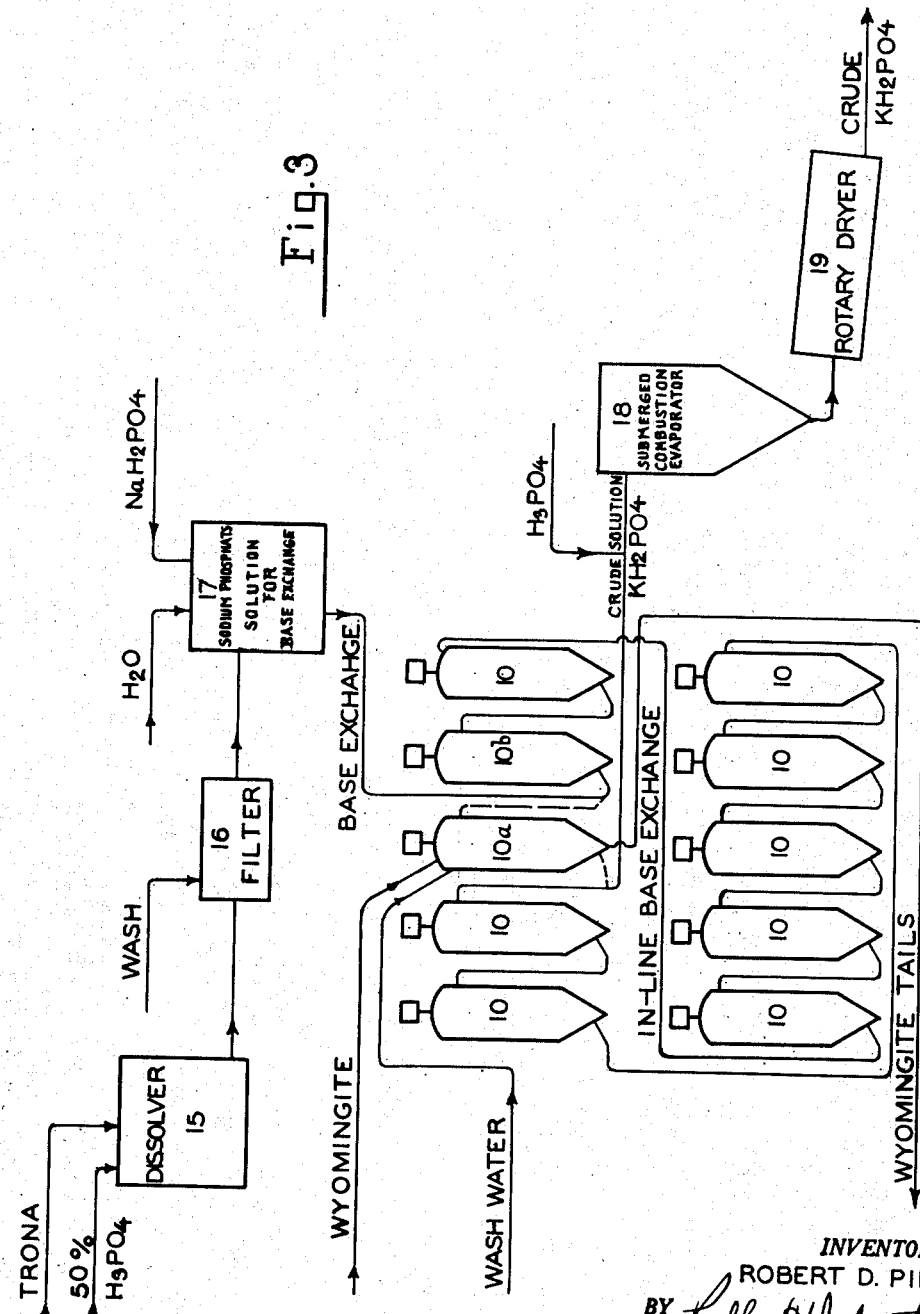
Figure 3 shows a diagrammatic arrangement of my process as applied to making crude potassium phosphate.

When operating the process to produce monopotassium phosphate-monosodium phosphate fertilizers as illustrated in Fig. 3, I preferably prepare the sodium phosphate compound for base exchange by dissolving trona in phosphoric acid in 15 to reach a pH of about 6.75–7.25. I preferably use crude Wyoming trona for this purpose. The insoluble material is filtered off in 16 and discarded and the concentration is adjusted in 17 with the equivalent of about 38.4 pounds NaH$_2$PO$_4$ to make the solution for base exchange, which is next fed to the in-line base exchange system 10.

The finished liquor issuing from 10 is acidified with H$_3$PO$_4$ to pH 4.4–6, as indicated above, corresponding to 98% to 88% of the total P$_2$O$_5$ as KH$_2$PO$_4$. This is then evaporated to substantial saturation in 18 and run to dryness in 19, producing a concentrated double carrier non-hydroscopic water soluble fertilizer of about the following analysis:

|  | Percent |
|---|---|
| Na$_2$O | 4.74 |
| K$_2$O | 28.30 |
| P$_2$O$_5$ | 53.40 |

While I have illustrated and described the production of two types of fertilizer in which both the basic and the acidic radicals carry plant food elements, it will be understood that the process is not limited to the specific examples given but may be used to produce other fertilizer compounds by base exchange between the sodium of a fertilizer salt and the potassium of the Wyomingite.

It will also be understood that while I have illustrated a preferred process and apparatus arrangement, the base exchange may be carried out by other steps and in other apparatus so long as it is capable of producing an end product which has a ratio of potassium to sodium in excess of 5 to 1.

Where the type of fertilizer being produced requires a higher ratio of sodium to potassium than 1 to 5, the base exchange process may be discontinued at the point where the sodium-potassium ratio is that desired and the product run to dryness at this point. Ordinarily, however, a high ratio of potassium to sodium is desired and can be provided by my process.

I claim:

1. The process for making fertilizers by base exchange between the potassium of Wyomingite and the sodium of a solution of a sodium salt of a plant food acid of the group consisting of sodium nitrate and sodium phosphate, whereby a potassium salt of the same acid is formed, which comprises flowing said solution progressively upwardly through substantially fixed beds of fragmented Wyomingite of increased potassium content positioned in a series of pressure retaining vessels maintained at elevated pressures to effect base exchange therein until a finished solution is obtained containing a potassium salt and a sodium salt of the plant food acid in which the potassium content exceeds the sodium content by at least 5 to 1, progressively discarding the spent Wyomingite residue from the vessel containing Wyomingite with the least potassium content, and running the finished liquor to dryness to produce a fertilizer.

2. The process for making fertilizer by base exchange under steam pressure between the potassium of Wyomingite and the sodium of a solution of the sodium salt of a plant food acid of the group consisting of sodium nitrate and monosodium phosphate, whereby a potassium salt of the same acid is formed, which comprises flowing an alkaline solution of said sodium salt progressively upwardly through substantially fixed beds of fragmented Wyomingite of increased potassium content positioned in a series of pressure retaining vessels maintained at elevated pressure and at high temperature to effect base exchange therein until a finished solution is obtained containing a crude potassium salt containing a major portion of K$_2$O and less than 10% of Na$_2$O, neutralizing the resulting solution, progressively discarding the spent Wyomingite residue from the vessel containing Wyomingite with the least potassium content, and running the finished liquor to dryness to produce a fertilizer.

3. The process for making fertilizer by base exchange between the potassium of Wyomingite and the sodium of a solution of sodium nitrate, whereby a potassium salt of the same acid is formed, which comprises flowing said solution progressively upwardly through substantially fixed beds of fragmented Wyomingite of increased potassium content positioned in a series of pressure retaining vessels maintained at elevated pressures to effect base exchange therein until a finished solution is obtained containing a major amount of potassium nitrate and a minor amount of sodium nitrate in which the potassium content exceeds the sodium content by at least 5 to 1, progressively discarding the spent Wyomingite residue from the vessel containing Wyomingite with the least potassium content, and running the finished liquor to dryness to produce a fertilizer.

4. The process for making fertilizer by base exchange between the potassium of Wyomingite and the sodium of a solution of sodium nitrate, whereby a potassium salt of the same acid is formed, which comprises flowing an alkaline solution of sodium nitrate progressively upwardly through substantially fixed beds of fragmented Wyomingite of increased potassium content positioned in a series of pressure retaining vessels maintained at elevated pressure and at high temperature to effect base exchange therein until a finished solution is obtained containing a crude sodium nitrate containing a major portion of K$_2$O and less than 10% of Na$_2$O, neutralizing the resulting solution, progressively discarding the spent Wyomingite residue from the vessel containing Wyomingite with the least potassium content, and running the finished liquor to dryness to produce a fertilizer.

5. The process for making fertilizer by base exchange between the potassium of Wyomingite and the sodium of a solution of sodium nitrate, whereby a potassium salt of the same acid is formed, which comprises flowing said solution progressively upwardly through substantially fixed beds of fragmented Wyomingite of increased potassium content positioned in a series of pressure retaining vessels maintained at elevated pressures to effect base exchange therein until a finished solution is obtained containing potassium nitrate and sodium nitrate in which the potassium content exceeds the sodium content by at least 5 to 1, progressively discarding the spent Wyomingite residue, evaporating about 20% of said solution to crystallize out about 15% of the total KNO$_3$ as commercially pure saltpeter, returning the mother liquor from the saltpeter crystallization to the main stream of solution and evaporating the combined stream to dryness thereby producing a potassium nitrate-sodium nitrate fertilizer containing not over 10% Na₂O and not less than 35% K₂O.

6. The process for making fertilizer by base exchange under steam pressure between the potassium of Wyomingite and the sodium of a solution of sodium nitrate, whereby a potassium salt of the same acid is formed, which comprises flowing an alkaline solution of the sodium nitrate progressively upwardly through substantially fixed beds of fragmented Wyomingite of increased potassium content positioned in a series of pressure retaining vessels maintained at elevated pressure and at high temperature so as to effect base exchange therein until a major part of the sodium has been exchanged for the potassium in the Wyomingite, progressively discarding the spent Wyomingite residue from the vessel containing Wyomingite with the least potassium content, neutralizing the resulting solution, evaporating a portion of said solution and crystallizing and recovering therefrom about 15% of the total KNO₃ present as pure potassium nitrate, returning the mother liquor from the step of crystallizing out the KNO₃ to the main stream, and running the solution to dryness thereby producing a crude potassium nitrate-sodium nitrate containing a major portion of K₂O and less than 10% of Na₂O.

7. A process for making crude and refined potassium nitrate by base exchange under steam pressure between the potassium of Wyomingite and the sodium of a solution of sodium nitrate, whereby potassium nitrate is formed, which comprises flowing said solution progressively upwardly through substantially fixed beds of fragmented Wyomingite of increased potassium content positioned in a series of pressure retaining vessels maintained at elevated pressures to effect base exchange therein until a finished solution is obtained containing potassium nitrate and sodium nitrate in which the potassium content exceeds the sodium content by at least 5 to 1, progressively discarding the spent Wyomingite residue, withdrawing a portion of said solution and recovering crystals of pure KNO₃ therefrom by evaporation, separating crystals from the mother liquor and returning the latter to the main stream, and running the combined stream to dryness thereby producing crude potassium nitrate containing less than 10% of Na₂O.

8. A process as defined by claim 7 in which pure potassium nitrate is not more than 15% of the total recovered.

9. The process for making fertilizer by base exchange between the potassium of Wyomingite and the sodium of a solution of sodium monophosphate, whereby a potassium salt of the same acid is formed, which comprises flowing said solution progressively upwardly through substantially fixed beds of fragmented Wyomingite of increased potassium content positioned in a series of pressure retaining vessels maintained at elevated pressures to effect base exchange therein until a finished solution is obtained containing a potassium salt and a sodium salt of the phosphate in which the potassium content exceeds the sodium content by at least 5 to 1, progressively discarding the spent Wyomingite residue from the vessel containing Wyomingite with the least potassium content, and running the finished liquor to dryness to produce a fertilizer.

10. The process for making fertilizer by base exchange between the potassium of Wyomingite and the sodium of a solution of sodium monophosphate, whereby a potassium salt of the same acid is formed, which comprises flowing said solution progressively upwardly through substantially fixed beds of fragmented Wyomingite of increased potassium content positioned in a series of pressure retaining vessels maintained at elevated pressures and high temperatures to effect base exchange therein until a finished solution is obtained containing a potassium salt and a sodium salt of the phosphate in which the potassium content exceeds the sodium content by at least 5 to 1, progressively discarding the spent Wyomingite residue from the vessel containing Wyomingite with the least potassium content, acidifying the resulting solution, and running the finished liquor to dryness to produce a crude monopotassium-monosodium phosphate containing a major proportion of potassium and less than 10% of Na₂O.

11. A process for making crude potassium fertilizer by base exchange under steam pressure between the potassium of Wyomingite and the sodium of a solution of sodium phosphate of pH of about 7.0 whereby potassium phosphate is formed, which comprises flowing said solution progressively upwardly through substantially fixed beds of fragmented Wyomingite of increased potassium content positioned in a series of pressure retaining vessels maintained at elevated pressures to effect base exchange therein until a finished solution is obtained containing potassium phosphate and sodium phosphate wherein the ratio of the potassium phosphate to the sodium phosphate is in excess of 4 to 1, progressively discarding the spent Wyomingite, adding phosphoric acid to said solution to reduce the pH to 4.4 to 6.0, and running the solution to dryness thereby producing a non-hygroscopic soluble potassium phosphate-sodium phosphate fertilizer.

ROBERT D. PIKE.

References Cited in the file of this patent

UNITED STATES PATENTS

| Number | Name | Date |
|---|---|---|
| Re. 18,393 | Pike | Mar. 22, 1932 |
| 1,276,555 | Meadows | Aug. 20, 1918 |
| 1,344,705 | Messerschmitt | June 29, 1920 |
| 1,344,830 | Spencer | June 29, 1920 |
| 2,455,190 | Pike | Nov. 30, 1948 |